(12) United States Patent
Wang

(10) Patent No.: US 11,090,799 B2
(45) Date of Patent: Aug. 17, 2021

(54) SOCKET HOLDER AND SOCKET RACK INCLUDING THE SAME

(71) Applicant: Dexing Precision Co., Ltd., Taichung (TW)

(72) Inventor: Chen-Hui Wang, Taichung (TW)

(73) Assignee: DEXING PRECISION CO., LTD., Taichung (TW)

( * ) Notice: Subject to any disclaimer, the term of this patent is extended or adjusted under 35 U.S.C. 154(b) by 423 days.

(21) Appl. No.: 16/231,866

(22) Filed: Dec. 24, 2018

(65) Prior Publication Data

US 2020/0198118 A1 Jun. 25, 2020

(51) Int. Cl.
| | | |
|---|---|---|
| *B25H 3/06* | (2006.01) | |
| *B25H 3/00* | (2006.01) | |
| *F16B 21/06* | (2006.01) | |
| *B25B 13/56* | (2006.01) | |

(52) U.S. Cl.
CPC ............. *B25H 3/003* (2013.01); *B25B 13/56* (2013.01); *B25H 3/06* (2013.01); *F16B 21/065* (2013.01)

(58) Field of Classification Search
CPC .......... B25H 3/003; B25H 13/56; B25H 3/06; B25H 3/04; F16B 21/065; B35H 3/04
USPC ........ 206/378; 211/70.6, 69, 94.01; 224/457
See application file for complete search history.

(56) References Cited

U.S. PATENT DOCUMENTS

| | | | |
|---|---|---|---|
| 1,712,473 A | 6/1929 | Mcwethy | |
| 5,228,570 A | 7/1993 | Robinson | |
| 5,715,951 A * | 2/1998 | Dembicks | B25B 13/56 206/378 |
| 5,725,107 A * | 3/1998 | Dembicks | B25H 3/06 206/378 |
| 5,855,284 A * | 1/1999 | Dembicks | B25H 3/06 211/70.6 |
| 5,897,001 A * | 4/1999 | Dembicks | B25H 3/06 211/70.6 |
| 6,095,329 A * | 8/2000 | Kao | B25H 3/003 206/378 |
| 6,386,363 B1 * | 5/2002 | Huang | B25H 3/003 206/1.5 |
| 6,450,338 B1 * | 9/2002 | Chen | B25H 3/003 206/378 |
| 6,712,225 B2 * | 3/2004 | McNeely | B25H 3/003 206/378 |

(Continued)

*Primary Examiner* — J. Gregory Pickett
*Assistant Examiner* — Tia Cox
(74) *Attorney, Agent, or Firm* — Muncy, Geissler, Olds & Lowe, P.C.

(57) ABSTRACT

A socket holder is provided, including: a seat, a sleeving member and a locking mechanism. The sleeving member includes a neck portion which is configured to be assembled with a socket. The sleeving member is movably assembled with the seat. The locking mechanism includes at least one first locking portion, at least one second locking portion which is releasably engagable with the at least one first locking portion, and an operational portion which is movable together with the at least one first locking portion. One of the at least one first locking portion and the at least one second locking portion is disposed on the seat and the other is disposed on the sleeving member. The operational portion includes an operational member which is located out of the neck portion and operable from outside of the socket holder.

10 Claims, 8 Drawing Sheets

(56) References Cited

U.S. PATENT DOCUMENTS

| | | | |
|---|---|---|---|
| 7,137,514 B1* | 11/2006 | Nickipuck | B25H 3/04 |
| | | | 211/70.6 |
| 9,539,721 B1* | 1/2017 | Kao | B25H 3/003 |
| 9,662,781 B1* | 5/2017 | Kao | B25H 3/003 |
| 9,821,451 B1* | 11/2017 | Kao | B25H 3/04 |
| 2006/0207951 A1* | 9/2006 | Wang | A47F 7/024 |
| | | | 211/70.6 |
| 2007/0215769 A1* | 9/2007 | Nebeker | B60R 13/0206 |
| | | | 248/220.31 |
| 2008/0128370 A1* | 6/2008 | Shih | B25H 3/003 |
| | | | 211/70.6 |
| 2008/0157489 A1* | 7/2008 | Kao | B25H 3/003 |
| | | | 279/97 |
| 2016/0169649 A1* | 6/2016 | Roth | F42B 39/02 |
| | | | 224/251 |
| 2016/0271788 A1* | 9/2016 | Hsieh | B25H 3/04 |
| 2017/0361453 A1* | 12/2017 | Kao | B25H 3/04 |
| 2019/0091842 A1* | 3/2019 | Chou | B25H 3/04 |
| 2020/0198118 A1* | 6/2020 | Wang | F16B 2/185 |

\* cited by examiner

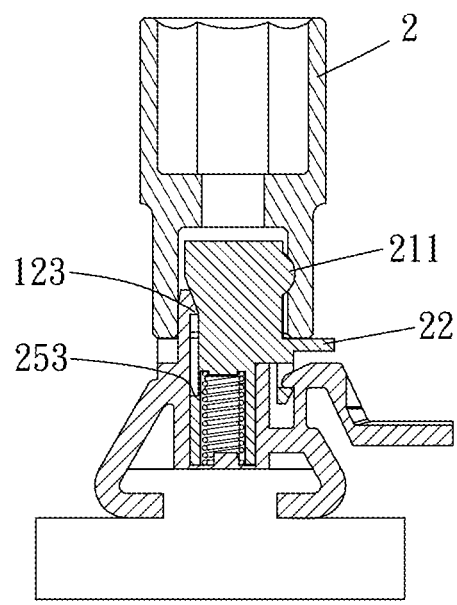
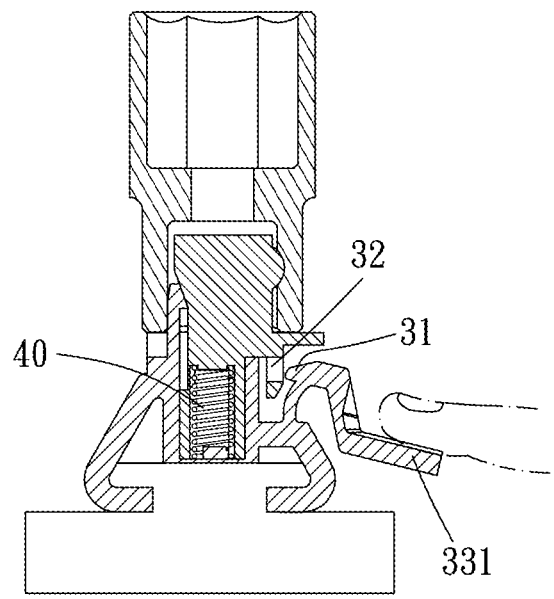
FIG. 5  FIG. 6
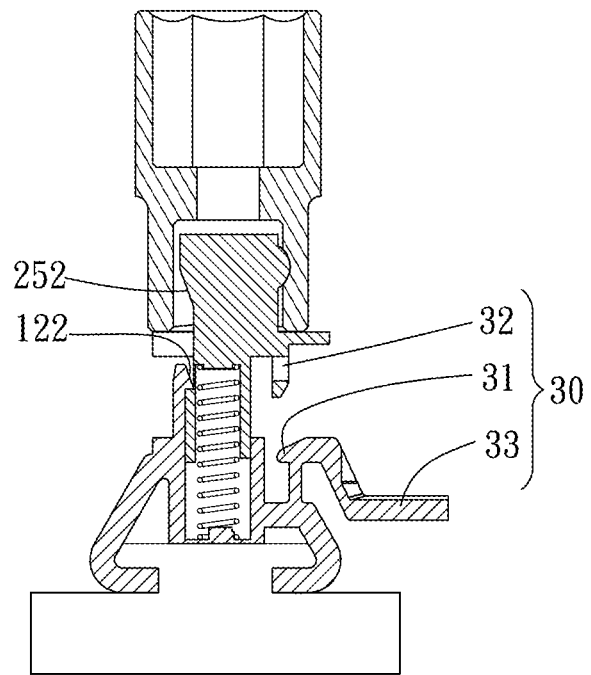
FIG. 7

SOCKET HOLDER AND SOCKET RACK INCLUDING THE SAME

BACKGROUND OF THE INVENTION

Field of the Invention

The present invention relates to a socket holder and socket rack including the same.

Description of the Prior Art

Generally, socket storage is carried out by disposing a socket into a receiving hole or on a socket seat of a tool rack, for easy carrying. A conventional socket holder is engaged with the socket by a detent ball, such as the socket holder disclosed in U.S. Pat. No. 1,712,473. An operator has to firmly hold the tool rack and pull up the socket, which is inconvenient when there is oil on the operator's hands or the socket. Therefore, a socket holder, such as disclosed in U.S. Pat. No. 5,228,570, is provided, and the socket holder is operated by compression of a spring to release a detent ball which is engaged between the socket and the socket seat. However, it is unable to confirm whether the socket is stably locked on the socket holder, which may cause disengagement of the socket from the socket holder. In addition, a sleeving portion and a connecting portion of the conventional socket holder are usually integrally made in one piece, which is inconvenient to maintain when the socket holder is partially broken.

The present invention is, therefore, arisen to obviate or at least mitigate the above-mentioned disadvantages.

SUMMARY OF THE INVENTION

The main object of the present invention is to provide a socket holder which can be stably assembled with a socket and is easy to operate.

To achieve the above and other objects, the present invention provides a socket holder, including: a seat, a sleeving member and a locking mechanism. The sleeving member includes a neck portion which is configured to be assembled with a socket. The sleeving member is movably assembled with the seat. The locking mechanism includes at least one first locking portion, at least one second locking portion which is releasably engagable with the at least one first locking portion, and an operational portion which is movable together with the at least one first locking portion. One of the at least one first locking portion and the at least one second locking portion is disposed on the seat and the other is disposed on the sleeving member. The operational portion includes an operational member which is located out of the neck portion and operable from outside of the socket holder. Operation of the operational member drives the at least one first locking portion so that the at least one first locking portion is unlockable with the at least one second locking portion.

To achieve the above and other objects, the present invention provides a socket rack, including at least one socket holder described above, the socket rack further including: a sliding rail on which the at least one socket holder is slidably disposed.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIGS. 5 to 7 are schematic diagrams showing operation of the first preferable embodiment of the present invention.

DETAILED DESCRIPTION OF THE PREFERRED EMBODIMENTS

Figure 1:
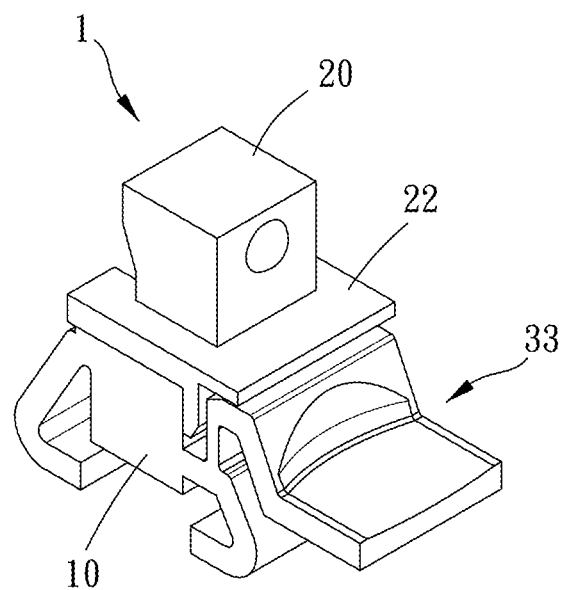
FIGS. 1 and 2 are stereograms of a first preferable embodiment of the present invention.
Figure 2:
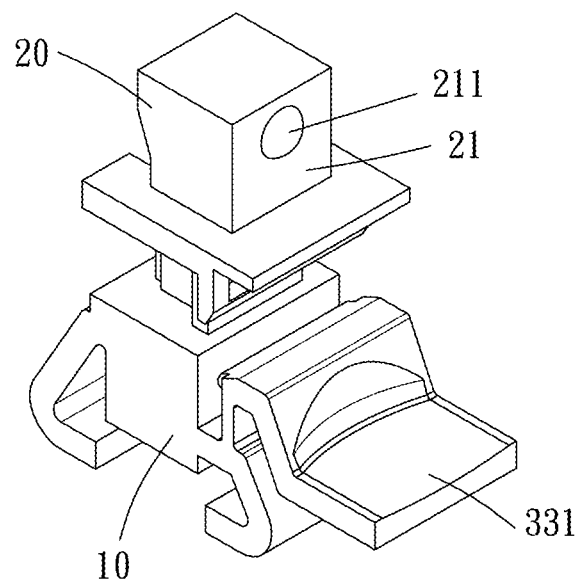
Figure 3:
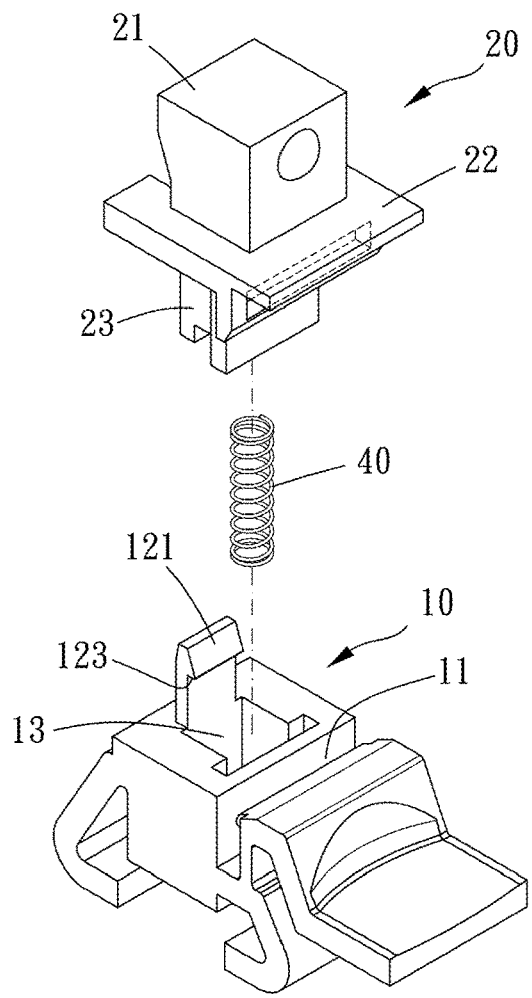
FIGS. 3 and 4 are breakdown drawings of the first preferable embodiment of the present invention.
Figure 4:
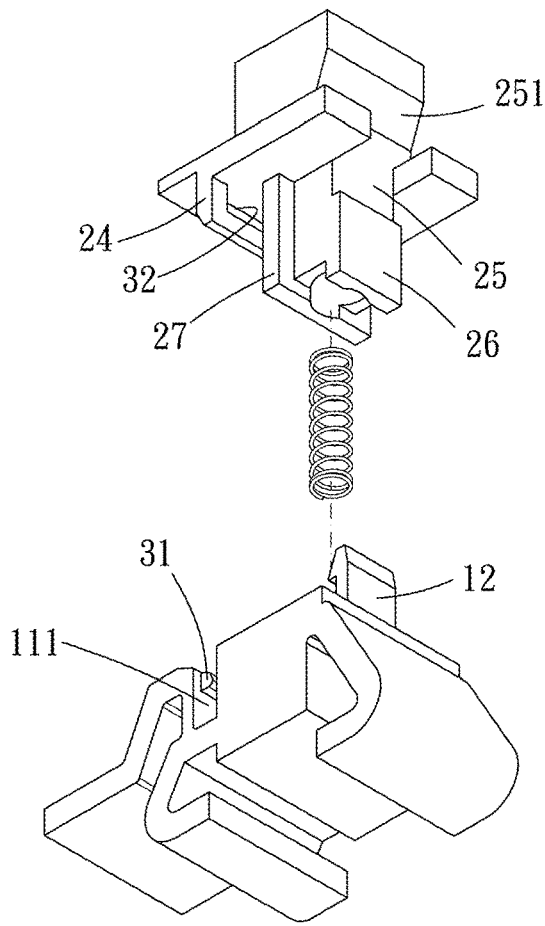

Please refer to FIGS. 1 to 9 for a first preferable embodiment of the present invention. A socket holder 1 of the present invention includes a seat 10, a sleeving member 20 and a locking mechanism 30.

The sleeving member 20 includes a neck portion 21 which is configured to be assembled with a socket 2, and the sleeving member 20 is movably assembled with the seat 10. The locking mechanism 30 includes at least one first locking portion 31, at least one second locking portion 32 which is releasably engagable with the at least one first locking portion 31, and an operational portion 33 which is movable together with the at least one first locking portion 31. One of the at least one first locking portion 31 and the at least one second locking portion 32 is disposed on the seat 10 and the other is disposed on the sleeving member 20. The operational portion 33 includes an operational member 331 which is located out of the neck portion 21 and operable from outside of the socket holder 1. Operation of the operational member 331 drives the at least one first locking portion 31 so that the at least one first locking portion 31 is unlockable with the at least one second locking portion 32. Therefore, the locking mechanism 30 is releasable by operating the operational member 331, which is convenient to operate.

The sleeving member 20 further includes a flange 22 extending radially and a connecting portion 23 inserted within the seat 10, and the connecting portion 23 and the neck portion 21 are respectively disposed at opposite sides of the flange 22. The sleeving member 20 further includes a rib 24 axially extending from the flange 22, and the seat 10 includes a slot 11 within which the rib 24 is received. One of the rib 24 and a sidewall 111 of the slot 11 has the at least one first locking portion 31 and the other of the rib 24 and the sidewall 111 of the slot 11 has the at least one second locking portion 32. The rib 24 is at least partially insertable into the slot 11 and the at least one first locking portion 31 is lockable with the at least one second locking portion 32. The sidewall 111 may be any of lateral sides of the slot 11 or a lateral side extending outwardly from the slot 11. The flange 22 is abuttable against the seat 10 so that a locking position of the locking mechanism 30 is accurately provided to prevent the sleeving member 20 from being excessively inserted into the seat 10 and resulting in damage of the locking mechanism 30. In another embodiments, the at least one first locking portion and the at least one second locking portion may be respectively disposed on any position of the sleeving member and the seat.

In this embodiment, the operational member 331 is resilient and extends integrally from the seat 10. Operation of the operational member 331 drives the at least one first locking portion 31 to displace with radial component of displacement to be unlocked from the at least one second locking portion 32. The at least one first locking portion 31 and the at least one second locking portion 32 are a projection and a recession respectively. The rib 24 has the recession and the sidewall 111 has the projection and the operational member 331 extends integrally from the sidewall 111. The projection can be displaced with radial component of displacement and disengaged from the recession by pressing the operational member 331. However, the operational member may be disposed on the sleeving member or additionally connected with the seat; the operational member may drive the at least one first locking portion to displace in any other direction to be unlocked from the at least one second locking portion; the recession may be disposed on the sidewall and the projection may be disposed on the rib.

The sleeving member 20 further has a concave portion 25. The concave portion 25 has a first abutting portion 251 which is located on the neck portion 21, and the seat 10 has an arm portion 12 axially extending therefrom and being insertable within the concave portion 25. The arm portion 12 has a second abutting portion 121, and at least one of the first abutting portion 251 and the second abutting portion 121 has an inclined face 122, 252 upwardly obliquely extending outwardly. When the at least one first locking portion 31 is engaged with the at least one second locking portion 32, the first abutting portion 251 is abutted against the second abutting portion 121. The neck portion 21 further has a positioning member 211 protruding therefrom, and the positioning member 211 is configured to be abutted against an engaging hole in the socket 2. As shown in FIGS. 5 to 7, a diametric dimension of the neck portion 21 is smaller than that of an assembling hole of the socket 2 so that the assembling hole can be easily sleeved on the neck portion 21. The first abutting portion 251 and the second abutting portion 121 respectively have one of the inclined face 122, 252. The positioning member 211 protrudes integrally from the neck portion 21. When the socket 2 is pressed down until the locking mechanism 30 is locked, the inclined face 122, 252 are abutted against each other and the positioning member 211 is at least partially engaged within the engaging hole, as shown in FIG. 5, so as to prevent disengagement of the socket 2 and have preferable stability and easy operation. However, one of the first abutting portion and the second abutting portion may have the inclined face and the other of the first abutting portion and the second abutting portion may have a corner, arcuate convex or the like; the positioning member may be additionally assembled to the neck portion. Preferably, the concave portion 25 further includes a shoulder face 253 located on a side opposite to the first abutting portion 251. The arm portion 12 further includes a hook portion 123, and the hook portion 123 is axially blockable by the shoulder face 253 so as to prevent the sleeving member 20 from directly departing from the seat 10. During operation, the locking mechanism 30 is releasable by pressing the operational member 331, and then the two inclined face 122, 252 is moved away from each other so that the socket 2 is removable from the neck portion 21, which is easy to operate.

The socket holder 1 further includes an elastic member 40 disposed between the seat 10 and the sleeving member 20, and the elastic member 40 biases the sleeving member 20 in a direction away from the seat 10. The sleeving member 20 further includes a narrow portion 26 and a wide portion 27 which extends laterally and is located on a side opposite to the concave portion 25. The seat 10 further includes a receiving groove 13, and the narrow portion 26 and the wide portion 27 are received within the receiving groove 13. Preferably, a contour of the receiving groove 13 corresponds to contours of the narrow portion 26 and the wide portion 27. When the projection is disengaged from the recession, the sleeving member 20 is biased by the elastic member 40 and moved away from the seat 10, and the wide portion 27 is abuttable against an inner wall of the receiving groove 13 so as to prevent the sleeving member 20 from skewing. The seat 10 and the sleeving member 20 are preferably respectively made in one piece, which has good structural integrity and is easy for manufacturing.

Figure 8:
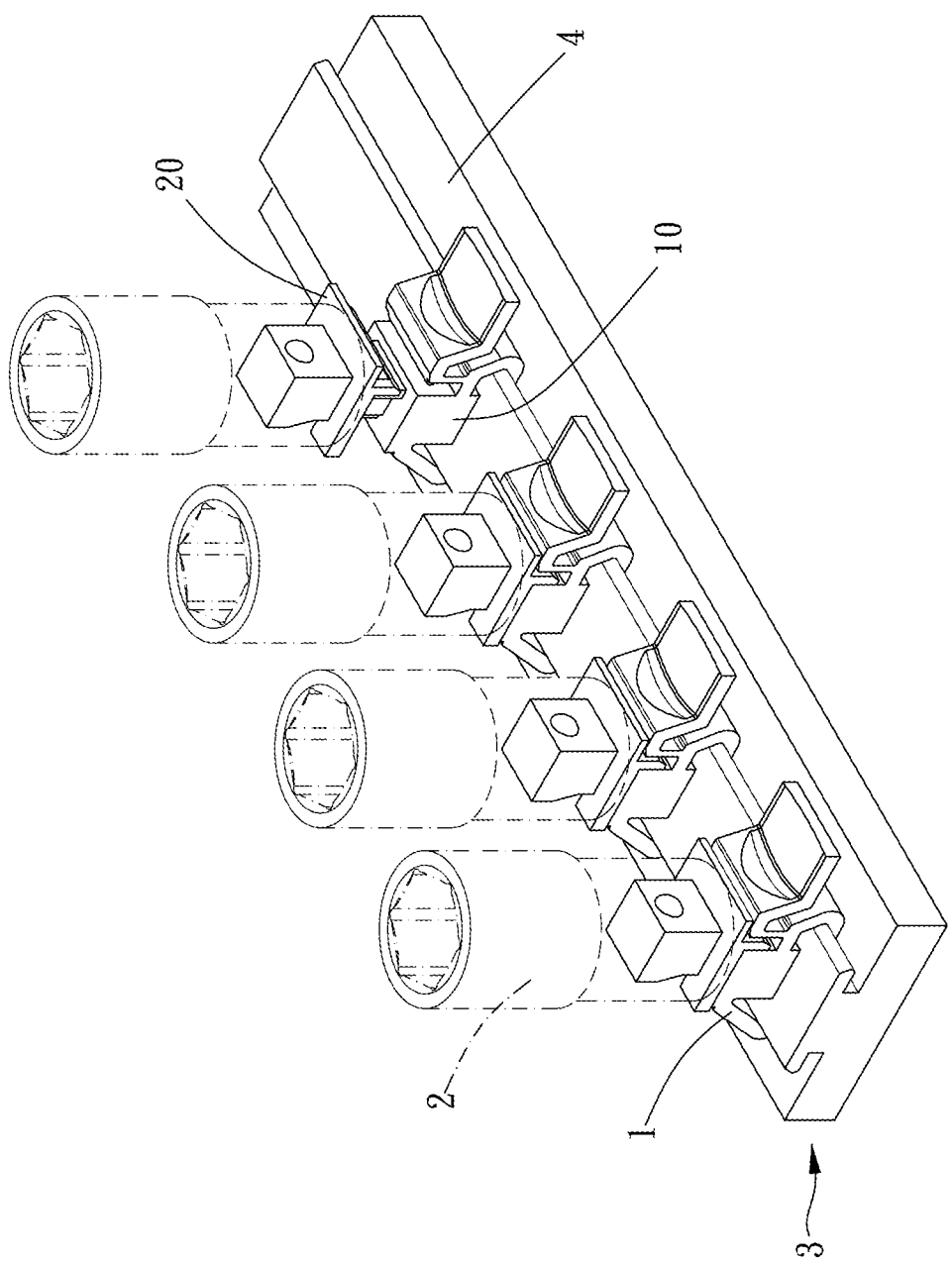
FIGS. 8 and 9 are schematic diagrams of a socket rack of the first preferable embodiment of the present invention in use.
Figure 9:
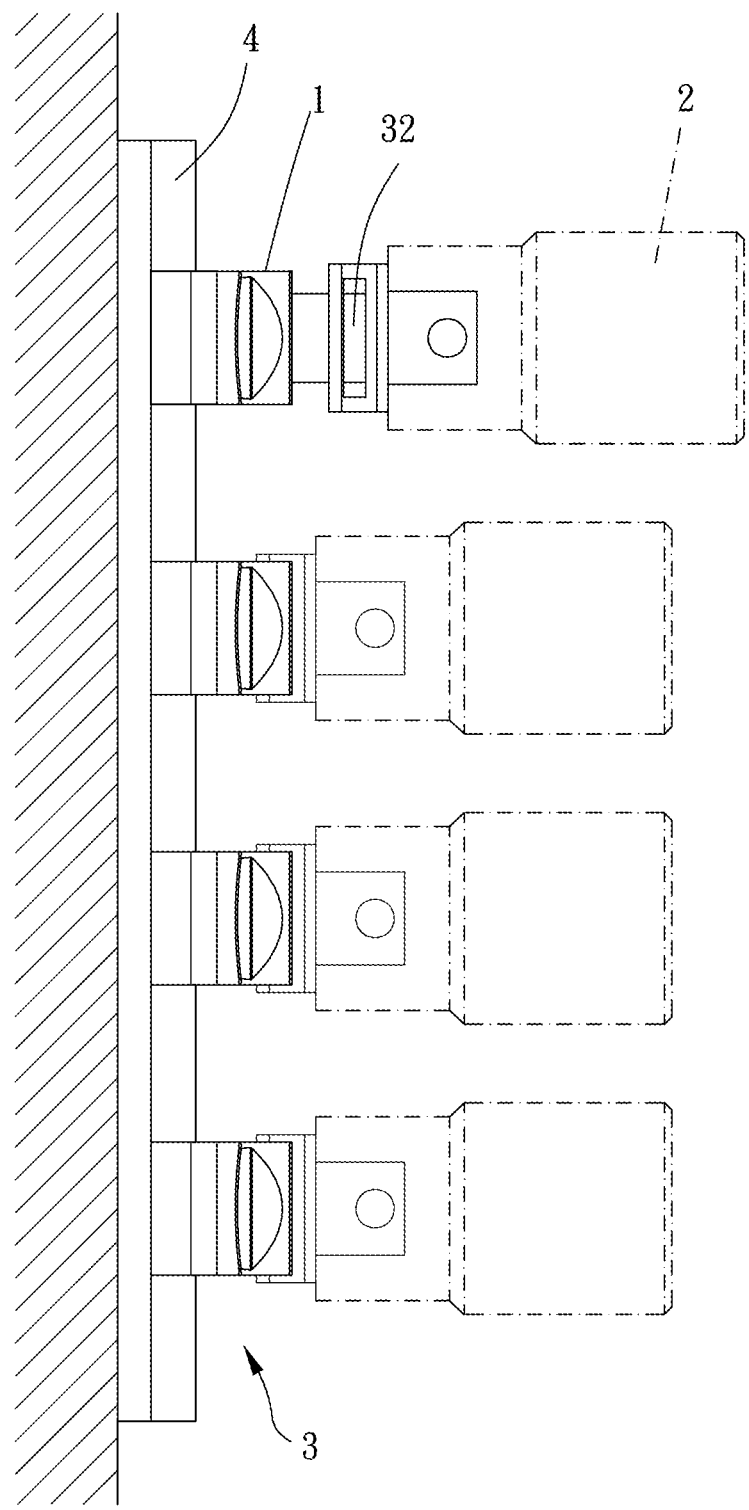

The present invention further provides a socket rack 3 which includes at least one socket holder 1 described above. The socket rack 3 further includes a sliding rail 4 on which the at least one socket holder 1 is slidably disposed. Preferably, the sliding rail 4 has a plurality of socket holders 1 disposed thereon, and each of the plurality of socket holders 1 is slidably disposed on the sliding rail 4, which can provide interval adjustment of any adjacent two of the plurality of socket holders 1, and the socket 2 can be locked to or released from the socket holder 1 by single hand. Furthermore, if one of the socket 2 is unlocked from one of the socket holder 1, the sleeving member 20 protrudes beyond the sleeving member 20 which is stably locked, as shown in FIGS. 8 and 9, which is convenient to confirm whether the socket 2 is locked. However, the socket holder may be connected to a tool rack by insertion, screwing or any other ways.

Figure 10:
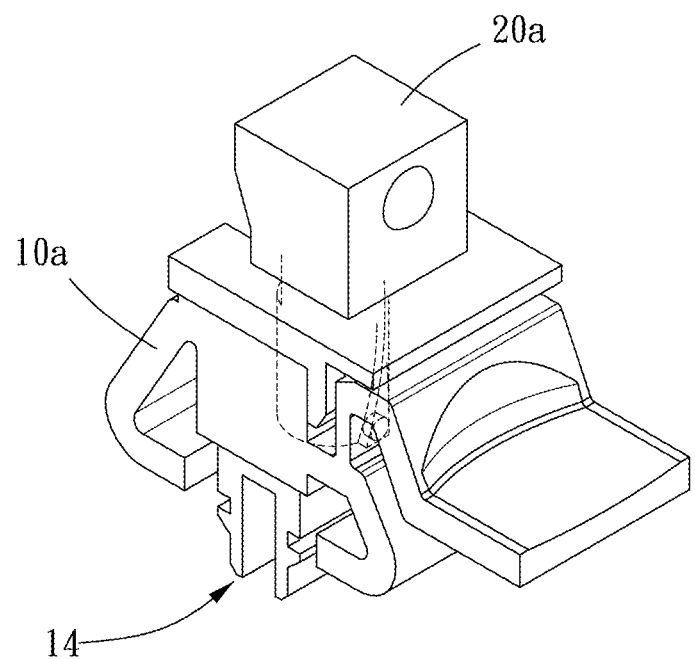
FIGS. 10 and 12 are stereograms of a second preferable embodiment of the present invention.
Figure 11:
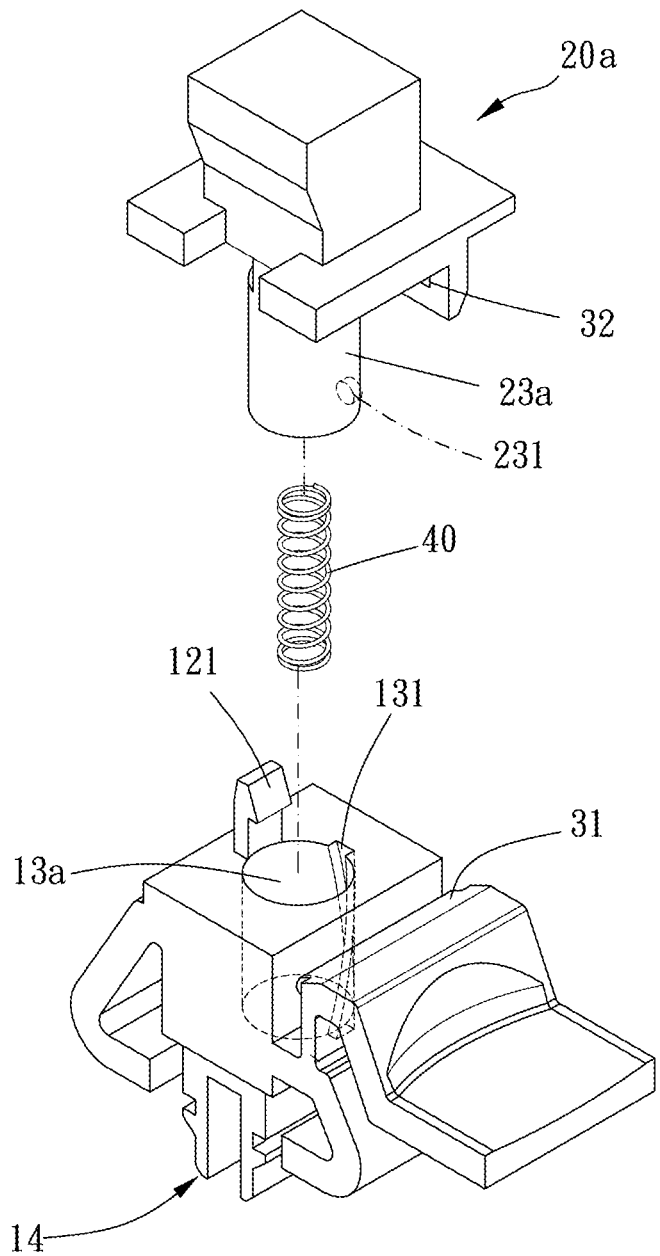
FIG. 11 is a breakdown drawing of the second preferable embodiment of the present invention.
Figure 12:
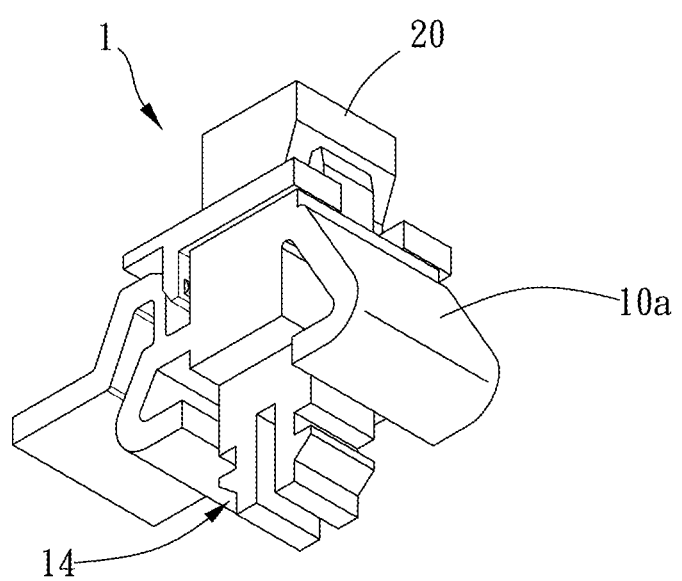

Refer to FIGS. 10 to 12 which show a second preferred embodiment of the present invention. The connecting portion 23a is a cylinder and has a block 231 laterally disposed therefrom, and a wall of the receiving groove 13a has a guiding groove 131. The block 231 is slidably disposed within the guiding groove 131. Therefore, the sleeving member 20a is rotatable and downwardly movable relative to the seat 10a to a certain angle, and then the first locking portion 31 corresponds to the second locking portion 32 to be locked with each other. However, the connecting portion and the receiving groove may be provided with any other configuration according to various requirements. In this embodiment, a bottom of the seat 10a further includes an inserting portion 14 extending downward and being configured to be inserted within a hole of a tool car or a display rack.

Although particular embodiments of the invention have been described in detail for purposes of illustration, various modifications and enhancements may be made without departing from the spirit and scope of the invention. Accordingly, the invention is not to be limited except as by the appended claims

What is claimed is:

1. A socket holder, including:
a seat;
a sleeving member, including a neck portion which is configured to be assembled with a socket, the sleeving member being movably assembled with the seat;
a locking mechanism, including at least one first locking portion, at least one second locking portion which is releasably engageable with the at least one first locking portion, and an operational portion which is movable together with the at least one first locking portion, one of the at least one first locking portion and the at least one second locking portion being disposed on the seat and the other being disposed on the sleeving member, the operational portion including an operational member, operation of the operational member driving the at least one first locking portion so that the at least one first locking portion is unlockable with the at least one second locking portion.

2. The socket holder of claim 1, further including an elastic member disposed between the seat and the sleeving member, wherein the elastic member biases the sleeving member in a direction away from the seat.

3. The socket holder of claim 1, wherein the sleeving member further includes a flange extending radially and a connecting portion inserted within the seat, and the connecting portion and the neck portion are respectively disposed at opposite sides of the flange.

4. The socket holder of claim 3, wherein the sleeving member further includes a rib axially extending from the flange, the seat includes a slot within which the rib is received, one of the rib and a sidewall of the slot has the at least one first locking portion and the other of the rib and the sidewall of the slot has the at least one second locking portion, and the rib is at least partially insertable into the slot and the at least one first locking portion is lockable with the at least one second locking portion.

5. The socket holder of claim 1, wherein the sleeving member further has a concave portion, the concave portion has a first abutting portion which is located on the neck portion, the seat has an arm portion axially extending therefrom and being insertable within the concave portion, the arm portion has a second abutting portion, at least one of the first abutting portion and the second abutting portion has an inclined face upwardly obliquely extending outwardly; when the at least one first locking portion is engaged with the at least one second locking portion, the first abutting portion is abutted against the second abutting portion.

6. The socket holder of claim 5, wherein the concave portion further includes a shoulder face located on a side opposite to the first abutting portion, the arm portion further includes a hook portion, and the hook portion is axially blockable by the shoulder face.

7. The socket holder of claim 5, wherein the sleeving member further includes a narrow portion and a wide portion which extends laterally and is located on a side opposite to the concave portion, the seat further includes a receiving groove, and the narrow portion and the wide portion are received within the receiving groove.

8. The socket holder of claim 1, wherein operation of the operational member drives the at least one first locking portion to displace with radial component of displacement to be unlocked from the at least one second locking portion.

9. The socket holder of claim 6, wherein the seat and the sleeving member are respectively made in one piece; the at least one first locking portion and the at least one second locking portion are a projection and a recession respectively; the socket holder further includes an elastic member disposed between the seat and the sleeving member, the elastic member biases the sleeving member in a direction away from the seat; the sleeving member further includes a flange extending radially and a connecting portion configured to be inserted within the seat, the connecting portion and the neck portion are respectively disposed at opposite sides of the flange; the sleeving member further includes a rib axially extending from the flange, the seat includes a slot within which the rib is received, the rib has the recession and a sidewall of the slot has the projection, the operational member extends integrally from the sidewall, the rib is at least partially insertable into the slot and the recession is engaged with the projection ; the sleeving member further includes a narrow portion and a wide portion which extends laterally and is located on opposite side of the concave portion, the seat further includes a receiving groove, the narrow portion and the wide portion are received within the receiving groove; operation of the operational member drives the at least one first locking portion to displace with radial component of displacement to be unlocked from the at least one second locking portion; the operational member is resilient and extends integrally from the seat; the neck portion further has a positioning member protruding therefrom, and the positioning member is configured to be abutted against an engaging hole in the socket.

10. A socket rack, including at least one socket holder of claim 1, the socket rack further including:
a sliding rail on which the at least one socket holder is slidably disposed.

* * * * *